United States Patent
Takahashi

(10) Patent No.: US 9,388,305 B2
(45) Date of Patent: Jul. 12, 2016

(54) THERMOPLASTIC ELASTOMER COMPOSITION AND MOLDED ARTICLE THEREOF

(71) Applicant: SUMITOMO CHEMICAL COMPANY, LIMITED, Tokyo (JP)

(72) Inventor: Shun Takahashi, Ichihara (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/733,317

(22) Filed: Jun. 8, 2015

(65) Prior Publication Data

US 2016/0032089 A1 Feb. 4, 2016

(30) Foreign Application Priority Data

Jul. 31, 2014 (JP) ................. 2014-156027

(51) Int. Cl.
*C08L 23/00* (2006.01)
*C08L 23/12* (2006.01)

(52) U.S. Cl.
CPC ............ *C08L 23/12* (2013.01); *C08L 2205/02* (2013.01); *C08L 2205/03* (2013.01); *C08L 2205/035* (2013.01); *C08L 2207/04* (2013.01)

(58) Field of Classification Search
CPC ....... C08L 23/12; C08L 23/142; C08L 23/16; C08L 2205/02; C08L 2205/035; C08L 2205/03

See application file for complete search history.

(56) References Cited

U.S. PATENT DOCUMENTS

| | | |
|---|---|---|
| 2006/0199909 A1 | 9/2006 | Toyoda et al. |
| 2007/0225446 A1 | 9/2007 | Nakano et al. |
| 2010/0207365 A1 | 8/2010 | Ohtani et al. |

FOREIGN PATENT DOCUMENTS

| | | |
|---|---|---|
| JP | S61-218606 A | 9/1986 |
| JP | S61-287904 A | 12/1986 |
| JP | H04275351 A | 9/1992 |
| JP | H05-194685 A | 8/1993 |
| JP | H07-216017 A | 8/1995 |
| JP | H09-316147 A | 12/1997 |
| JP | 2003-183459 A | 7/2003 |
| JP | 2004-182981 A | 7/2004 |
| JP | 2006-282992 A | 10/2006 |
| JP | 2007-254690 A | 10/2007 |
| JP | 2007-284669 A | 11/2007 |
| JP | 2009-024054 A | 2/2009 |

*Primary Examiner* — Nathan M Nutter

(74) *Attorney, Agent, or Firm* — Fitch, Even, Tabin & Flannery LLP

(57) ABSTRACT

The thermoplastic elastomer composition includes (A) a polypropylene resin, (B) a non-conjugated diene copolymer having a Mooney viscosity ($ML_{1+4}$, 125° C.) of 40 to 85 and a molecular weight distribution of 1.5 to 3.0 and whose eluted amount at −15° C. measured by cross-fractionation chromatography is 50% to 99.9% of the overall eluted amount, and (C) an ethylene copolymer having a Mooney viscosity ($ML_{1+4}$, 125° C.) of 20 to 30 and a density of 0.850 $g/cm^3$ to 0.890 $g/cm^3$. The content of (A) is 40% by weight to 70% by weight. The combined content of (B) and (C) is 30% by weight to 60% by weight. The ratio of the content of (B) to the content of (C) is 1.1 to 20. The composition exhibits good dimension stability during its molding process. A molded article superior in tensile strength, low temperature impact resistance, and rigidity can be obtained from the composition.

4 Claims, No Drawings

THERMOPLASTIC ELASTOMER COMPOSITION AND MOLDED ARTICLE THEREOF

CROSS-REFERENCE TO RELATED APPLICATION

This U.S. application claims the foreign priority filing date benefit of Japanese Application JP 2014-156027, filed Jul. 31, 2014, and the full disclosure of said Japanese application is incorporated herein by reference.

BACKGROUND OF THE INVENTION

1. Technical Field

The present invention relates to a thermoplastic elastomer composition capable of affording a molded article superior in tensile strength, low temperature impact resistance, and rigidity and capable of exhibiting good dimensional stability when being molded, and a molded article thereof.

2. Background Art

An airbag system of an automobile includes an airbag cover for storing an airbag. Airbag covers are required to be broken certainly and also be shatterproofing when the airbag is expanded on vehicle collision, and to have sufficient strength to be used in cold climates. Various thermoplastic elastomer compositions and molded articles thereof have heretofore been proposed for airbag applications (see, for example, JP-A-2009-024054, which is also published as US 2010/0207365 A1, and JP-A-2006-282992, which is also published as US 2006/0199909 A1).

However, the molded articles disclosed in the above-cited patent documents are required to have further improved tensile strength, low temperature impact resistance, and rigidity, and the thermoplastic elastomer compositions disclosed in the above-cited patent documents are insufficient also in dimensional stability.

SUMMARY OF THE INVENTION

Under such circumstances, the problem to be solved by the present invention is to provide a thermoplastic elastomer composition capable of affording a molded article superior in tensile strength, low temperature impact resistance, and rigidity and capable of exhibiting good dimensional stability when being molded, and a molded article thereof.

The present invention relates to a thermoplastic elastomer composition comprising component (A) defined below, component (B) defined below, and component (C) defined below, wherein the content of the component (A) is 40% by weight to 70% by weight and the combined content of the component (B) and the component (C) is 30% by weight to 60% by weight, where the total of the contents of the components (A), (B), and (C) is taken as 100% by weight, and the ratio of the content of the component (B) to the content of the component (C) is 1.1 to 20, component (A): a polypropylene resin having a content of monomer units derived from propylene of more than 60% by weight but not more than 100% by weight, where the overall amount of the polypropylene resin is taken as 100% by weight;

component (B): a non-conjugated diene copolymer comprising monomer units derived from ethylene, monomer units derived from at least one selected from the group consisting of propylene and α-olefins having 4 or more carbon atoms, and monomer units derived from a non-conjugated diene, wherein the content of the monomer units derived from ethylene is 40% by weight to 65% by weight, and the content of the monomer units derived from the at least one selected from the group consisting of propylene and α-olefins having 4 or more carbon atoms is 35% by weight to 60% by weight, where the total of the content of the monomer units derived from ethylene and the content of the monomer units derived from the at least one selected from the group consisting of propylene and α-olefins having 4 or more carbon atoms is taken as 100% by weight, the non-conjugated diene polymer having an iodine value of 0.1 to 20, a Mooney viscosity ($ML_{1+4}$, 125° C.) of 40 to 85, a molecular weight distribution of 1.5 to 3.0, and the eluted amount at −15° C. measured by cross-fractionation chromatography (CFC) is 50% to 99.9% of the overall eluted amount;

component (C): an ethylene copolymer comprising monomer units derived from ethylene and monomer units derived from at least one selected from the group consisting of propylene and α-olefins having 4 or more carbon atoms, wherein the content of the monomer units derived from ethylene is 55% by weight to 95% by weight, and the content of the monomer units derived from the at least one selected from the group consisting of propylene and α-olefins having 4 or more carbon atoms is 5% by weight to 45% by weight, where the overall amount of the component (C) is taken as 100% by weight, and the copolymer having a Mooney viscosity ($ML_{1+4}$, 125° C.) of 20 to 30 and a density of 0.850 g/cm³ to 0.890 g/cm³.

According to the present invention, it is possible to obtain a thermoplastic elastomer composition capable of affording a molded article superior in tensile strength, low temperature impact resistance, and rigidity and capable of exhibiting good dimensional stability when being molded, and a molded article thereof.

DETAILED DESCRIPTION OF THE PREFERRED EMBODIMENTS

[Thermoplastic Elastomer Composition]

The thermoplastic elastomer composition according to the present invention is a composition comprising component (A) being a polypropylene resin, component (B) being a non-conjugated diene copolymer, and component (C) being an ethylene copolymer. The components will be described individually below.

<Component (A)>

The component (A) in the present invention is a polypropylene resin having a content of monomer units derived from propylene being more than 60% by weight and not more than 100% by weight. Examples of such a polypropylene resin include a propylene homopolymer, a propylene random copolymer, and a propylene polymeric material as described below. The component (A) may include only one kind of polypropylene resin and also may include two or more kinds of polypropylene resin.

Examples of the above-mentioned propylene random copolymer include:

(1) a propylene-ethylene random copolymer having a content of monomer units derived from propylene of 90% by weight to 99.5% by weight and a content of monomer units derived from ethylene of 0.5% by weight to 10% by weight, where the combined content of the monomer units derived from propylene and the monomer units derived from ethylene is taken as 100% by weight;

(2) a propylene-ethylene-α-olefin random copolymer having a content of monomer units derived from propylene of 81% by weight to 99% by weight, a content of monomer units derived from ethylene of 0.5% by weight to 9.5% by weight, and a content of monomer units derived from an α-olefin having 4 to 10 carbon atoms of 0.5% by weight to 9.5% by weight, where the combined content of the monomer units derived from propylene, the monomer units derived from ethylene, and the monomer units derived from the α-olefin having 4 to 10 carbon atoms is taken as 100% by weight;

(3) a propylene-α-olefin random copolymer having a content of monomer units derived from propylene of 90% by weight to 99.5% by weight and a content of monomer units derived from an α-olefin having 4 to 10 carbon atoms of 0.5% by weight to 10% by weight, where the combined content of the monomer units derived from propylene and the monomer units derived from the α-olefin having 4 to 10 carbon atoms is taken as 100% by weight.

Examples of the α-olefins having 4 to 10 carbon atoms in each of the aforementioned propylene-ethylene-α-olefin random copolymer and the aforementioned propylene-α-olefin random copolymer include 1-butene, 1-pentene, 1-hexene, 1-heptene, 1-octene, 1-nonene, 1-decene, 3-methyl-1-butene, 3-methyl-1-pentene, 4-methyl-1-pentene, 2-ethyl-1-hexene, and 2,2,4-trimethyl-1-pentene.

Examples of a method for producing the above-mentioned propylene homopolymer and a method for producing the above-mentioned propylene random copolymer include methods using a publicly known polymerization method using a publicly known catalyst for olefin polymerization, such as a slurry polymerization, a solution polymerization method, a bulk polymerization method, and a gas phase polymerization method, using a Ziegler-Natta catalyst or a complex catalyst, such as a metallocene complex and a non-metallocene complex.

The aforementioned propylene polymeric material is a polymeric material composed of a propylene homopolymer component (I) and an ethylene copolymer component (II) comprising monomer units derived from at least one selected from the group consisting of propylene and α-olefins having 4 or more carbon atoms and monomer units derived from ethylene. The content of the propylene homopolymer component (I) in the propylene polymeric material is 70% by weight to 95% by weight, and the content of the ethylene copolymer component (II) is 5% by weight to 30% by weight. From the viewpoint of the low temperature impact resistance of a molded article, it is preferred that the content of the propylene homopolymer component (I) in the propylene polymeric material is 75% by weight to 95% by weight, and the content of the ethylene copolymer component (II) is 5% by weight to 25% by weight, where the overall amount of the propylene polymeric material is taken as 100% by weight.

Examples of the α-olefin having 4 or more carbon atoms in the ethylene copolymer component (II) include 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 4-methyl-1-pentene, 2-ethyl-1-hexene, and 2,2,4-trimethyl-1-pentene. As the α-olefin having 4 or more carbon atoms, α-olefins having 4 to 20 carbon atoms are preferred, α-olefins having 4 to 10 carbon atoms are more preferred, and 1-butene, 1-hexene, or 1-octene is even more preferred. Such α-olefins having 4 or more carbon atoms may be used singly or alternatively may be used in combination.

From the viewpoint of the low temperature impact resistance of a molded article, the content of the monomer units derived from ethylene in the ethylene copolymer component (II) is 22% by weight to 80% by weight, preferably 25% by weight to 70% by weight, and more preferably 27% by weight to 60% by weight. From the viewpoint of the low temperature impact resistance of a molded article, the content of the monomer units derived from at least one selected from the group consisting of propylene and α-olefins having 4 or more carbon atoms in the ethylene copolymer component (II) is 20% by weight to 78% by weight, preferably 30% by weight to 75% by weight, and more preferably 40% by weight to 73% by weight, where the combined content of the monomer units derived from at least one selected from the group consisting of propylene and α-olefins having 4 or more carbon atoms and the monomer units derived from ethylene is taken as 100% by weight. The content of the monomer units derived from at least one selected from the group consisting of propylene and α-olefins having 4 or more carbon atoms and the content of the monomer units derived from ethylene can be determined by infrared spectroscopy.

Examples of the ethylene copolymer component (II) include a propylene-ethylene copolymer, an ethylene-(1-butene) copolymer, an ethylene-(1-hexene) copolymer, an ethylene-(1-octene) copolymer, a propylene-ethylene-(1-butene) copolymer, a propylene-ethylene-(1-hexene) copolymer, and a propylene-ethylene-(1-octene) copolymer; a propylene-ethylene copolymer or a propylene-ethylene-(1-butene) copolymer is preferable. The ethylene copolymer component (II) may be either a random copolymer or a block copolymer.

From the viewpoint of the low temperature impact resistance of a molded article, the intrinsic viscosity of a portion soluble in xylene at 20° C. (henceforth referred to as a CXS portion) of the propylene polymeric material is preferably 2.0 dl/g to 8.0 dl/g, more preferably 2.2 dl/g to 7.0 dl/g. The ratio of [ηcxs] to the intrinsic viscosity of a portion insoluble in xylene at 20° C. (henceforth referred to as a CXIS portion) (the intrinsic viscosity is henceforth referred to as [ηcxis]) is preferably from 2.0 to 12.0. An intrinsic viscosity is determined in the following procedures. A reduced viscosity is measured in Tetralin at 135° C. with an Ubbelohde viscometer, and from the reduced viscosity obtained, an intrinsic viscosity is then determined by an extrapolation method in accordance with the calculation method disclosed in "Kobunshi Yoeki (Polymer Solution), Kobunshi Jikkengaku (Polymer Experiment Study) Vol. 11" page 491 (published by Kyoritsu Shuppan Co., Ltd., 1982).

Here, the CXS portion and the CXIS portion are obtained by the following method. A propylene polymeric material weighing about 5 g is dissolved completely in 500 ml of boiling xylene. The resulting xylene solution is cooled slowly to 20° C. and then conditioned at 20° C. for 4 hours or more, and then a precipitate and a solution are separated by filtration. The precipitate is the CXIS portion, and the matter obtained by removing the solvent from the solution is the CXS portion.

The propylene polymeric material can be produced via multistage polymerization using a polymerization catalyst. For example, the propylene polymeric material can be produced by producing its propylene homopolymer component (I) by an earlier polymerization step and producing its ethylene copolymer component (II) by a later polymerization step.

Examples of the polymerization catalyst to be used for the production of the propylene polymeric material include Ziegler type catalyst systems, Ziegler-Natta type catalyst systems, catalyst systems composed of a Group 4 transition metal compound having a cyclopentadienyl ring and an alkyl aluminoxane, and catalyst systems composed of a Group 4 transition metal compound having a cyclopentadienyl ring, a compound capable of reacting with the transition metal compound to form an ionic complex, and an organoaluminum compound.

A preliminarily polymerized catalyst may be used in the presence of the polymerization catalyst. Examples of the preliminarily polymerized catalyst include the catalyst systems disclosed in JP-A-61-218606, JP-A-61-287904, JP-A-5-194685, JP-A-7-216017, JP-A-9-316147, JP-A-10-212319, and JP-A-2004-182981.

Examples of the polymerization method used in the production of the propylene polymeric material include bulk polymerization, solution polymerization, slurry polymerization, and gas phase polymerization. Examples of an inert hydrocarbon solvent to be used for solution polymerization and slurry polymerization include propane, butane, isobutane, pentane, hexane, heptane, and octane. These polymerization methods may be performed in combination and also may be either in a batch mode or in a continuous mode. As the polymerization method used in the production of the propylene polymeric material, continuous gas phase polymerization and bulk-gas phase polymerization in which bulk polymerization and gas phase polymerization are performed continuously are preferred.

The melt flow rate of the polypropylene resin of the component (A) measured at 230° C. under a load of 21.18 N in accordance with JIS K7210 is usually 10 g/10 minutes to 300 g/10 minutes, and from the viewpoint of the tensile strength of a molded article, it is preferably 10 g/10 minutes to 100 g/10 minutes.

The isotactic pentad fraction of the polypropylene resin of the component (A) measured by $^{13}$C-NMR is preferably 0.95 or more, more preferably 0.98 or more.

The isotactic pentad fraction is the fraction of the propylene monomer units located at the centers of the isotactic sequences in the pentad units within a molecular chain of a polypropylene resin, in other words, the fraction of the propylene monomer units located within the sequences (henceforth represented by mmmm) in which five propylene monomer units are contiguously meso-bonded. The method for measuring the isotactic pentad fraction is the method disclosed by A. Zambelli, et al. in Macromolecules 6, 925 (1973), i.e., a method measured with $^{13}$C-NMR.

Specifically, the ratio of the area of an NMR peak assigned to mmmm to the area of an absorption peak within the methyl carbon region, both measured using a $^{13}$C-NMR spectrum is the isotactic pentad fraction.

The melting temperature of the polypropylene resin of the component (A) is usually 100° C. or more. The melting temperatures of the propylene homopolymer and the propylene polymeric material as the component (A) are preferably 155° C. or more and more preferably 160° C. or more. The melting temperature of the propylene random copolymer as the component (A) is preferably 130° C. or more and more preferably 135° C. or more. The melting temperature of the polypropylene resin of the component (A) is usually 175° C. or less. In the present invention, the melting temperature is the peak temperature of the endothermic peak having the highest peak temperature in a differential scanning calorimetry curve measured with a differential scanning calorimeter during a temperature raising operation. The conditions for measuring a differential scanning calorimetry curve with a differential scanning calorimeter are as follows.

<Measurement Conditions>

Temperature falling operation: after melting a polypropylene resin at 220° C., the temperature is lowered from 220° C. to −90° C. at a temperature ramp-down rate of 5° C./min.

Temperature raising operation: immediately after the lowering of the temperature from 220° C. to −90° C., the temperature is raised from −90° C. to 200° C. at a temperature ramp-up rate of 5° C./min.

The content of the component (A) in the thermoplastic elastomer composition of the present invention is 40% by weight to 70% by weight, where the combined content of the component (A), the component (B), and the component (C) is taken as 100% by weight. From the viewpoint of the tensile strength and the rigidity of a molded article, the content of the component (A) is preferably 45% by weight to 67% by weight, more preferably 50% by weight to 65% by weight.

<Component (B)>

The component (B) in the present invention is a non-conjugated diene copolymer comprising monomer units derived from ethylene, monomer units derived from at least one selected from the group consisting of propylene and α-olefins having 4 or more carbon atoms, and monomer units derived from a non-conjugated diene, wherein the content of the monomer units derived from ethylene is 40% by weight to 65% by weight, the content of the monomer units derived from the at least one selected from the group consisting of propylene and α-olefins having 4 or more carbon atoms is 35% by weight to 60% by weight, where the combined content of the monomer units derived from ethylene and the monomer units derived from the at least one selected from the group consisting of propylene and α-olefins having 4 or more carbon atoms is taken as 100% by weight, the non-conjugated diene polymer having an iodine value of 0.1 to 20, a Mooney viscosity ($ML_{1+4}$, 125° C.) of 40 to 85, a molecular weight distribution of 1.5 to 3.0, and the eluted amount at −15° C. measured by cross-fractionation chromatography (CFC) is 50% to 99.9% of the overall eluted amount.

Examples of a method for producing the component (B) include methods using a publicly known polymerization method using a publicly known catalyst for olefin polymerization, such as a slurry polymerization, a solution polymerization method, a bulk polymerization method, and a gas phase polymerization method, using a Ziegler-Natta catalyst or a complex catalyst, such as a metallocene complex and a non-metallocene complex.

Examples of the Ziegler-Natta catalyst include a combination of a vanadium compound represented by the following formula (1) and an organoaluminum compound represented by the following formula (2),

$$VO(OR)_m X_{3-m}, \qquad \text{formula (1)}$$

wherein R represents a linear hydrocarbon group having 1 to 8 carbon atoms, X represents a halogen atom, and m represents a number satisfying 0≤m≤3,

$$R''_j AlX''_{3-j}, \qquad \text{formula (2)}$$

wherein R'' represents a hydrocarbon group, X'' represents a halogen atom, and j represents a number satisfying 0<j≤3.

Examples of the vanadium compound represented by formula (1) include $VOCl_3$, $VO(OCH_3)Cl_2$, $VO(OC_2H_5)Cl_2$, $VO(O(n-C_3H_7))Cl_2$, $VO(O(n-C_4H_9))Cl_2$, $VO(O(n-C_5H_{11}))Cl_2$, $VO(O(n-C_6H_{13}))Cl_2$, $VO(O(n-C_7H_{15}))Cl_2$, $VO(O(n-C_8H_{17}))Cl_2$, $VO(OCH_3)_{0.5}Cl_{2.5}$, $VO(OC_2H_5)_{0.5}Cl_{2.5}$, $VO(O(n-C_3H_7))_{0.5}Cl_{2.5}$, $VO(O(n-C_4H_9))_{0.5}Cl_{2.5}$, $VO(O(n-C_5H_{11}))_{0.5}Cl_{2.5}$, $VO(O(n-C_6H_{13}))_{0.5}Cl_{2.5}$, $VO(O(n-C_7H_{15}))_{0.5}Cl_{2.5}$, $VO(O(n-C_8H_{17}))_{0.5}Cl_{2.5}$, $VO(OCH_3)_{0.8}Cl_{2.2}$, $VO(OC_2H_5)_{0.8}Cl_{2.2}$, $VO(O(n-C_3H_7))_{0.8}Cl_{2.2}$, $VO(O(n-C_4H_9))_{0.8}Cl_{2.2}$, $VO(O(n-C_5H_{11}))_{0.8}Cl_{2.2}$, $VO(O(n-C_6H_{13}))_{0.8}Cl_{2.2}$, $VO(O(n-C_7H_{15}))_{0.8}Cl_{2.2}$, and $VO(O(n-C_8H_{17}))_{0.8}Cl_{2.2}$, $VO(OCH_3)_{1.5}Cl_{1.5}$, $VO(OC_2H_5)_{1.5}Cl_{1.5}$, $VO(O(n-C_3H_7))_{1.5}Cl_{1.5}$, $VO(O(n-C_4H_9))_{1.5}Cl_{1.5}$, VO(O(n-

$C_5H_{11}))_{1.5}Cl_{1.5}$, $VO(O(n\text{-}C_6H_{13}))_{1.5}Cl_{1.5}$, $VO(O(n\text{-}C_7H_{15}))_{1.5}Cl_{1.5}$, $VO(O(n\text{-}C_8H_{17}))_{1.5}Cl_{1.5}$, $VO(OCH_3)_{1.8}Cl_{1.2}$, $VO(OC_2H_5)_{1.8}Cl_{1.2}$, $VO(O(n\text{-}C_3H_7))_{1.8}Cl_{1.2}$, $VO(O(n\text{-}C_4H_9)_{1.8}Cl_{1.2}$, $VO(O(n\text{-}C_5H_{11}))_{1.8}Cl_{1.2}$, $VO(O(n\text{-}C_6H_{13}))_{1.8}Cl_{1.2}$, $VO(O(n\text{-}C_7H_{15}))$ $1.8Cl_{1.2}$, and $VO(O(n\text{-}C_8H_{17}))$ $1.8Cl_{1.2}$. As the vanadium compound represented by formula (1), preferred is $VOCl_3$, $VO(OC_2H_5)$ $Cl_2$, $VO(OC_2H_5)_{0.5}Cl_{2.5}$, $VO(OC_2H_5)_{0.8}Cl_{2.2}$, $VO(OC_2H_5)_{1.5}Cl_{1.5}$ or $VO(OC_2H_5)_{1.8}Cl_{1.2}$.

Among the vanadium compounds represented by formula (1), compounds in which m is greater than 0 can be obtained by a method comprising reacting $VOX_3$ with ROH in a prescribed molar ratio. For example, a reaction of $VOCl_3$ with $C_2H_5OH$ is represented by the following formula.

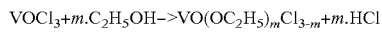

$VOCl_3 + m.C_2H_5OH \rightarrow VO(OC_2H_5)_m Cl_{3-m} + m.HCl$

As the vanadium compound represented by formula (1), preferred is a compound in which m is greater than 0.

In the formula (2), R" represents a hydrocarbon group, examples of which include alkyl groups having 1 to 10 carbon atoms, such as a methyl group, an ethyl group, a n-propyl group, an isopropyl group, a n-butyl group, an isobutyl group, a pentyl group, and a hexyl group. X" represents a halogen atom and examples thereof include a chlorine atom and a bromine atom. j represents a number satisfying $0 < j \leq 3$, and preferred is a number satisfying $1 \leq j \leq 2$.

Examples of the organoaluminum compound represented by the formula (2) include $(C_2H_5)_2AlCl$, $(n\text{-}C_4H_9)_2AlCl$, $(iso\text{-}C_4H_9)_2AlCl$, $(n\text{-}C_6H_{13})_2AlCl$, $(n\text{-}C_2H_5)_{1.5}AlCl_{1.5}$, $(n\text{-}C_4H_9)_{1.5}AlCl_{1.5}$, $(iso\text{-}C_4H_9)_{1.5}AlCl_{1.5}$, $(n\text{-}C_6H_{13})_{1.5}AlCl_{1.5}$, $C_2H_5AlCl_2$, $(n\text{-}C_4H_9)AlCl_2$, $(iso\text{-}C_4H_9)AlCl_2$, and $(n\text{-}C_6H_{13})AlCl_2$.

The molar ratio of the used amount of the organoaluminum compound represented by the above formula (2) to the used amount of the vanadium compound represented by the above formula (1) (the number of moles of the organoaluminum compound/the number of moles of the vanadium compound) is preferably from 2.5 to 50.

As a polymerization solvent, there can be used an inert solvent, such as a liphatic hydrocarbons, such as propane, butane, isobutane, pentane, hexane, heptane, and octane, and alicyclic hydrocarbons, such as cyclopentane and cyclohexane.

The polymerization temperature is usually −20° C. to 200° C., preferably 0° C. to 150° C., more preferably 20° C. to 120° C. The polymerization pressure is usually 0.1 MPa to 10 MPa, preferably 0.1 MPa to 5 MPa, more preferably 0.1 MPa to 3 MPa.

In order to adjust the molecular weight of the non-conjugated diene copolymer to be formed, a molecular weight regulator, such as hydrogen, may be used.

The α-olefin having 4 or more carbon atoms in the non-conjugated diene copolymer of the component (B) is preferably an α-olefin having 4 to 8 carbon atoms, examples of which include 1-butene, 2-methylpropylene, 1-pentene, 3-methyl-1-butene, 1-hexene, 4-methyl-1-pentene, and 1-octene. As the α-olefin having 4 to 8 carbon atoms, preferred is 1-butene, 1-hexene, or 1-octene. Such α-olefins having 4 or more carbon atoms may be used singly or alternatively may be used in combination.

Examples of the non-conjugated diene in the "monomer units derived from a non-conjugated diene" include linear non-conjugated dienes, such as 1,4-hexadiene, 1,6-octadiene, 2-methyl-1,5-hexadiene, 6-methyl-1,5-heptadiene, and 7-methyl-1,6-octadiene; cyclic non-conjugated dienes, such as cyclohexadiene, dicyclopentadiene, methyltetrahydroindene, 5-vinylnorbornene, 5-ethylidene-2-norbornene, 5-methylene-2-norbornene, 5-isopropylidene-2-norbornene, and 6-chloromethyl-5-isopropenyl-2-norbornene; trienes, such as 2,3-diisopropylidene-5-norbornene, 2-ethylidene-3-isopropyridene-5-norbornene, 2-propenyl-2,2-norbornadiene, 1,3,7-octatriene, and 1,4,9-decatriene, and preferred is 5-ethylidene-2-norbornene, 5-vinyl norbornene, or dicyclopentadiene.

The content of the monomer units derived from ethylene in the non-conjugated diene copolymer of the component (B) is 40% by weight to 65% by weight, and from the viewpoint of the low temperature impact resistance of a molded article, it is preferably 42% by weight to 60% by weight, more preferably 45% by weight to 55% by weight. The content of the monomer units derived from propylene in the component (B) is 35% by weight to 60% by weight, and from the viewpoint of the low temperature impact resistance of a molded article, it is preferably 40% by weight to 58% by weight, more preferably 45% by weight to 55% by weight, where the combined content of the monomer units derived from ethylene and the monomer units derived from propylene is taken as 100% by weight.

The content of the monomer units derived from ethylene and the content of the monomer units derived from at least one selected from the group consisting of propylene and α-olefins having 4 or more carbon atoms in the non-conjugated diene copolymer of the component (B) can be determined by infrared spectroscopy.

The non-conjugated diene copolymer of the component (B) has a Mooney viscosity ($ML_{1+4}$, 125° C.) measured at 125° C. of 40 to 85, preferably 43 to 75, more preferably 45 to 70. The Mooney viscosity is measured in accordance with ASTM D-1646.

The iodine value of the non-conjugated diene copolymer of the component (B) is 0.1 to 20, and from the viewpoint of the rigidity of a molded article, it is preferably 0.1 to 15, more preferably 0.1 to 10. An iodine value refers to the number of grams of the iodine used for a reaction that is a reaction of 100 g of a sample with iodine.

The iodine value of a non-conjugated diene copolymer can be determined by infrared spectroscopy.

The molecular weight distribution of the non-conjugated diene copolymer of the component (B) is 1.5 to 3.0, and from the viewpoint of the low temperature impact resistance of a molded article, it is preferably 1.5 to 2.5, more preferably 1.5 to 2.3.

A molecular weight distribution is a ratio of a weight average molecular weight (Mw) to a number average molecular weight (Mn), both measured by gel permeation chromatography, i.e., Mw/Mn.

The eluted amount at −15° C. measured by cross-fractionation chromatography (CFC) of the non-conjugated diene copolymer of the component (B) is 50% to 99.9% relative to 100% of the overall eluted amount, and from the viewpoint of the low temperature impact resistance of a molded article, it is preferably 85% to 99.9%, more preferably 93% to 99.9%. The eluted amount at −15° C. measured by cross-fractionation chromatography (CFC) can be adjusted with the feeding rate of ethylene at the time of production and the kind of the catalyst to be used.

The cross-fractionation chromatography (CFC) is composed of a temperature rising elution fractionation (TREF) part to perform crystalline fractionation and a gel permeation chromatography (GPC) part to perform molecular weight fractionation.

The eluted amount at −15° C. measured by cross-fractionation chromatography (CFC) is a ratio of the eluted amount at −15° C. to the overall eluted amount, and its concrete measurement method and measurement conditions are as follows.

A component (B) is dissolved in orthodichlorobenzene to prepare an orthodichlorobenzene solution having a concentration of 1.0 mg/ml. The orthodichlorobenzene solution is poured into a TREF column adjusted at 140° C. in a CFC analyzer and then it is held for 20 minutes. Subsequently, the temperature of the TREF column is lowered to −15° C. at a rate of 0.5° C./min and then held at −15° C. for 30 minutes. Then, an eluted amount at −15° C. is measured with an infrared spectrophotometer. Subsequently, an operation of raising the temperature of the TREF column by 5° C. and then holding the temperature at the reached temperature for a prescribed period of time (i.e., approximately 27 minutes) is repeated until the temperature of the TREF reaches 140° C., and the amount (% by mass) of a fraction eluted during each temperature range is measured. The temperature ramp-up rate when raising the temperature of the TREF column by 5° C. is 20° C./min. The aforementioned "temperature range" means a range composed of a temperature raise and the following temperature holding. From the eluted amounts (% by mass) measured at the individual temperature ranges, an elution temperature-eluted amount curve is produced, and the integral value from −15° C. to 140° C. in the curve is defined as an overall eluted amount. From the overall eluted amount and the eluted amount at −15° C., the eluted amount at −15° C. measured by cross-fractionation chromatography (CFC) is determined.

(1) Instrument: Automated 3D analyzer CFC-2 manufactured by Polymer ChAR (2) TREF column: stainless steel microball column (3/8" o.d.×150 mm)

(3) Eluent: orthodichlorobenzene (for high-performance liquid chromatography)

(4) Sample solution concentration: 20 mg of sample (component (B))/orthodichlorobenzene 20 mL (5) Injection volume: 0.5 mL (6) Pump flow rate: 1.0 mL/min (7) GPC column: Tosoh GMHHR-H(S), three columns (8) Detector: infrared spectrophotometer IR5 manufactured by Polymer ChAR <Component (C)>

The component (C) in the present invention is an ethylene copolymer comprising monomer units derived from ethylene and monomer units derived from at least one selected from the group consisting of propylene and α-olefins having 4 or more carbon atoms, wherein the content of the monomer units derived from ethylene is 55% by weight to 95% by weight, and the content of the monomer units derived from the at least one selected from the group consisting of propylene and α-olefins having 4 or more carbon atoms is 5% by weight to 45% by weight, where the overall amount of the component (C) is taken as 100% by weight, and the copolymer having a Mooney viscosity ($ML_{1+4}$, 125° C.) of 20 to 30 and a density of 0.850 g/cm$^3$ to 0.890 g/cm$^3$. The ethylene copolymer may have two or more kinds of monomer units derived from α-olefins having 4 or more carbon atoms.

The α-olefin having 4 or more carbon atoms in the ethylene copolymer of the component (C) is an α-olefin having 4 to 8 carbon atoms, examples of which include 1-butene, 2-methylpropylene, 1-pentene, 3-methyl-1-butene, 1-hexene, 4-methyl-1-pentene, and 1-octene. As the α-olefin having 4 to 8 carbon atoms, preferred is 1-butene, 1-hexene, or 1-octene.

In the ethylene copolymer, the content of the monomer units derived from ethylene is 55% by weight to 95% by weight, preferably 57% by weight to 90% by weight, and the content of the monomer units derived from at least one selected from the group consisting of propylene and α-olefins having 4 or more carbon atoms is 5% by weight to 45% by weight, preferably 10% by weight to 40% by weight, where the overall amount of the component (C) is taken as 100% by weight.

The content of the monomer units derived from ethylene and the content of the monomer units derived from at least one selected from the group consisting of propylene and α-olefins having 4 or more carbon atoms in the ethylene copolymer can be determined by nuclear magnetic resonance spectrometry (NMR).

The density of the ethylene copolymer of the component (C) is 0.850 g/cm$^3$ to 0.890 g/cm$^3$, and from the viewpoint of the low temperature impact resistance of a molded article and the dimensional stability at the time of forming a molded article, it is preferably 0.850 g/cm$^3$ to 0.875 g/cm$^3$.

From the viewpoint of the tensile strength of a molded article, the Mooney viscosity measured at 125° C. ($ML_{1+4}$, 125° C.) of the ethylene copolymer is 20 to 30.

The combined content of the component (B) and the component (C) in the thermoplastic elastomer composition is 30% by weight to 60% by weight, and from the viewpoint of the tensile strength and the rigidity of a molded article, it is preferably 33% by weight to 55% by weight, more preferably 35% by weight to 50% by weight, where the combined content of the component (A), the component (B), and the component (C) is taken as 100% by weight.

From the viewpoint of the low temperature impact resistance of a molded article, the ratio of the content of the component (B) to the content of the component (C) in the thermoplastic elastomer composition is from 1.1 to 20, preferably from 1.3 to 10, more preferably 1.5 to 7.

Examples of a method for producing the non-conjugated diene copolymer of the component (B) and a method for producing the ethylene copolymer of the component (C) include methods using a publicly known polymerization method using a publicly known catalyst for olefin polymerization, such as a slurry polymerization, a solution polymerization method, a bulk polymerization method, and a gas phase polymerization method, using a Ziegler-Natta catalyst or a complex catalyst, such as a metallocene complex and a non-metallocene complex.

The thermoplastic elastomer composition of the present invention may further comprise a fatty acid having 5 or more carbon atoms, a metal salt of a fatty acid having 5 or more carbon atoms, an amide compound of a fatty acid having 5 or more carbon atoms, or an ester compound of a fatty acid having 5 or more carbon atoms; these may be contained singly or in combination.

Examples of the fatty acid having 5 or more carbon atoms include lauryl acid, palmitic acid, stearic acid, behenic acid, oleic acid, erucic acid, linoleic oil, and ricinoleic acid.

Examples of the fatty acid constituting the metal salt of a fatty acid having 5 or more carbon atoms include lauryl acid, palmitic acid, stearic acid, behenic acid, oleic acid, erucic acid, linoleic oil, and ricinoleic acid. Examples of the metal include Li, Na, Mg, Al, K, Ca, Zn, Ba, and Pb. Examples of the metal salt of a fatty acid having 5 or more carbon atoms include lithium stearate, sodium stearate, calcium stearate, and zinc stearate.

Examples of the amide compound of a fatty acid having 5 or more carbon atoms include lauramide, palmitamide, stearamide, oleamide, erucamide, methylenebisstearamide, ethylenebisstearamide, ethylenebisoleamide, and stearyldiethanolamide, and preferred is erucamide.

Examples of the ester compound of a fatty acid having 5 or more carbon atoms include an ester of an alcohol with the above-mentioned fatty acid having 5 or more carbon atoms.

Examples of the alcohol include aliphatic alcohols, such as myristyl alcohol, palmityl alcohol, stearyl alcohol, behenyl alcohol, and 12-hydroxystearyl alcohol; aromatic alcohols, such as benzyl alcohol, β-phenylethyl alcohol, and phthalyl alcohol; polyhydric alcohols, such as glycerin, diglycerin, polyglycerin, sorbitan, sorbitol, propylene glycol, polypropylene glycol, polyethylene glycol, pentaerythritol, and trimethylolpropane.

Examples of the ester of a fatty acid having 5 or more carbon atoms include glycerin monooleate, glycerin dioleate, polyethylene glycol monostearate, and citryl distearate.

The content of the fatty acid having 5 or more carbon atoms, the metal salt of a fatty acid having 5 or more carbon atoms, the amide compound of a fatty acid having 5 or more carbon atoms, or the ester compound of a fatty acid having 5 or more carbon atoms is preferably 0.01 parts by weight to 1.5 parts by weight, more preferably 0.05 parts by weight to 1.0 part by weight, where the combined content of the component (A), the component (B), and the component (C) is taken as 100 parts by weight.

Optionally, the thermoplastic elastomer composition of the present invention may contain an inorganic filler, such as a talc, calcium carbonate, and calcined kaolin, an organic filler, such as fiber, wood flour, and cellulose powder, a lubricant, such as silicone oil and silicone gum, an antioxidant, a weathering stabilizer, a UV absorber, a heat stabilizer, a light stabilizer, a pigment, a nucleating agent, an adsorbent, a softener, etc.

Examples of the softener include mineral oils such as a paraffinic mineral oil, a naphthenic mineral oil, and an aromatic mineral oil; a paraffinic mineral oil is preferred. The softener may be added when melt-kneading component (A), component (B), and component (C), and examples of a method of mixing a non-conjugated diene copolymer with a softener beforehand include (1) a method in which a non-conjugated diene copolymer (this may be a commercial product) as a product is mixed with a softener by means of a publicly known mixing machine, and (2) a method in which a solution of a non-conjugated diene copolymer as an intermediate during the production of the non-conjugated diene copolymer is mixed with a softener to prepare a mixture and then the solvent in this mixture is removed. The component (B) may be a commercial product. A non-conjugated diene copolymer extended with a softener is referred to as an oil-extended non-conjugated diene copolymer.

The thermoplastic elastomer composition of the present invention can be obtained by melt-kneading the component (A), the component (B), and the component (C). Optionally, an inorganic filler, such as a talc, calcium carbonate, and calcined kaolin, an organic filler, such as fiber, wood flour, and cellulose powder, a lubricant, such as silicone oil and silicone gum, an antioxidant, a weathering stabilizer, a UV absorber, a heat stabilizer, a light stabilizer, a pigment, a nucleating agent, an adsorbent, a softener, and so on may be incorporated.

Examples of the melt-kneading apparatus to be used for the melt-kneading include a mixing roll, which is an open type apparatus, a Banbury mixer, which is a non-open type apparatus, an extruder, a kneader, and a continuous mixer. In the present invention, use of a non-open type apparatus is preferred. When melt-kneading the thermoplastic elastomer composition, it is permitted to add all the components at once and then melt-knead them, and it is also permitted to add some components, then add the remainder, and then melt-knead them. The melt-kneading may be performed at two or more separate times. The temperature at the time of melt-kneading is usually 150° C. to 250° C. and the melt-kneading time is usually 30 seconds to 30 minutes.

Examples of a molded article produced by molding the thermoplastic elastomer composition of the present invention include automotive interior parts, such as an airbag cover, an instrument panel, and a pillar, automotive exterior parts, such as a molding, household electric appliance components, building materials, furniture, and sundries.

The method of molding the thermoplastic elastomer composition of the present invention may be a publicly known molding method; preferred is an injection molding method. When injection molding the thermoplastic elastomer composition of the present invention, the molding temperature at the time of injection molding is usually 150° C. to 300° C., preferably 180° C. to 280° C., more preferably 200° C. to 250° C. The temperature of a mold to be used for injection molding is usually 0° C. to 100° C., preferably 20° C. to 90° C., more preferably 40° C. to 80° C., even more preferably 50° C. to 75° C.

EXAMPLES

The present invention is described in more detail below with reference to examples and comparative examples.

[Measurement of Physical Properties]

1. Melt Flow Rate (MFR)

A melt flow rate was measured at 230° C. under a load of 21.18 N in accordance with JIS K7210.

2. Melting Temperature

The peak temperature of the endothermic peak having the highest peak temperature in a differential scanning calorimetry curve measured with a differential scanning calorimeter during a temperature raising operation is defined as a melting temperature. The conditions for measuring a differential scanning calorimetry curve with a differential scanning calorimeter are as follows.

<Measurement Conditions>

A sample is melted at 220° C. and then the temperature thereof is lowered from 220° C. to −90° C. at a temperature ramp-down rate of 5° C./min.

Temperature raising operation: immediately after the lowering of the temperature from 220° C. to −90° C., the temperature is raised from −90° C. to 200° C. at a temperature ramp-up rate of 5° C./min.

3. Intrinsic Viscosity ([ηcxs], [ηcxis], Unit: dl/g)

A sample weighing about 5 g was dissolved completely in 500 ml of boiling xylene, the xylene solution was then cooled slowly and conditioned at 20° C. for 4 hours or more, and then a precipitate and a solution were separated by filtration. The precipitate was defined as a CXIS portion and the matter obtained by removing the solvent from the solution was defined as a CXS portion.

A reduced viscosity was measured in Tetralin at 135° C. with an Ubbelohde viscometer, and from the reduced viscosity obtained, an intrinsic viscosity was then determined by an extrapolation method in accordance with the calculation method disclosed in "Kobunshi Yoeki (Polymer Solution), Kobunshi Jikkengaku (Polymer Experiment Study) Vol. 11" page 491 (published by Kyoritsu Shuppan Co., Ltd., 1982).

4. Isotactic Pentad Fraction

Measurement was performed by nuclear magnetic resonance spectroscopy (NMR) under the following conditions (1) to (7), and then the ratio of the area of the NMR peak assigned to mmmm to the area of the NMR peaks located within the methyl carbon region is calculated and an isotactic pentad fraction was calculated in accordance with the method disclosed in literature (Macromolecules, 6, 925 (1973)).

(1) Instrument: AvanceIII HD600 (10-mm cryoprobe), produced by BRUKER (2) Measurement solvent: 1,2-dichlorobenzene-d4/1,2-dichlorobenzene (20/80 volume ratio)

(3) Measurement temperature: 130° C.

(4) Measurement method: proton decoupling method (5) Pulse width: 45 degrees (6) Pulse repetition time: 4 seconds (7) Chemical shift standard: tetramethylsilane 5. The Content of the Monomer Units Derived from Ethylene and the Content of the Monomer Units Derived from at Least One Selected from the Group Consisting of Propylene and α-Olefins Having 4 or More Carbon Atoms in the Non-Conjugated Diene Copolymer of the Component (B)

A non-conjugated diene copolymer was formed into an about 0.1 mm thick film with a hot press, and the infrared absorption spectrum of the film was measured with an infrared spectrophotometer (IR-810, manufactured by JASCO Corp.). From the infrared absorption spectrum, the content of the monomer units derived from ethylene and the content of the monomer units derived from at least one selected from the group consisting of propylene and α-olefins having 4 or more carbon atoms in the non-conjugated diene copolymer were determined in accordance with the method disclosed in documents (Takayama, Usami, et al., "Characterization of Polyethylene by Infrared Absorption Spectrum"; Mc Rae, M. A., Madam S, W. F. et al., Die Makromolekulare Chemie, 177, 461 (1976)).

6. Iodine Value of Non-Conjugated Diene Copolymer of Component (B)

A non-conjugated diene copolymer was formed into an about 0.5 mm thick film with a hot press. The intensity of a peak derived from dicyclopentadiene (an absorption peak at 1611 $cm^{-1}$) and the intensity of a peak derived from 5-ethylidene-2-norbornene (an absorption peak at 1688 $cm^{-1}$) of the film were measured with an infrared spectrophotometer. From the peak intensities, the molar content of double bonds was determined and an iodine value was calculated from the molar content.

7. Molecular Weight Distribution

By gel permeation chromatography (GPC) under the following conditions (1) through (9), a weight average molecular weight (Mw) and a number average molecular weight (Mn) were measured and then a molecular weight distribution (Mw/Mn) was calculated.

(1) Instrument: HLC-8121 GPC/HT manufactured by Tosoh Corporation (2) Separation column: GMHHR-H(S) HT three columns, produced by Tosoh Corporation (3) Measurement temperature: 140° C.

(4) Carrier: orthodichlorobenzene (5) Flow rate: 1.0 mL/min (6) Sample concentration: about 1 mg/mL (7) Sample injection amount: 400 L (8) Detector: differential refraction (9) Molecular weight standard substance: standard polystyrenes 8. Eluted Amount at −15° C. Or More Measured by Cross-fractionation Chromatography (CFC)

A component (B) was dissolved in orthodichlorobenzene to prepare an orthodichlorobenzene solution having a concentration of 1.0 mg/ml by weight. The orthodichlorobenzene solution was poured into a TREF column adjusted at 140° C. in a CFC analyzer and then it was held for 20 minutes. Subsequently, the temperature of the TREF column was lowered to −15° C. at a rate of 0.5° C./min and then held at −15° C. for 30 minutes. Then, an eluted amount (% by mass) was measured with an infrared spectrophotometer. Subsequently, an operation of raising the temperature of the TREF column by 5° C. and then holding the temperature at the reached temperature for a prescribed period of time (i.e., approximately 27 minutes) was repeated until the temperature of the TREF reaches 140° C., and the amount (% by mass) of a fraction eluted during each temperature range was measured. The temperature ramp-up rate when raising the temperature of the TREF column by 5° C. was 20° C./min. From the eluted amounts (% by mass) measured at the individual temperature ranges, an elution temperature-eluted amount curve was produced, and the integral value from −15° C. to 140° C. in the curve was defined as an overall eluted amount. From the overall eluted amount and the eluted amount at −15° C., the eluted amount at −15° C. measured by cross-fractionation chromatography (CFC) was determined.

(1) Instrument: Automated 3D analyzer CFC-2 manufactured by Polymer ChAR (2) TREF column: stainless steel microball column (⅜" o.d.×150 mm)

(3) Eluent: orthodichlorobenzene (for high-performance liquid chromatography)

(4) Sample solution concentration: 20 mg of sample (component (B))/orthodichlorobenzene 20 mL (5) Injection volume: 0.5 mL (6) Pump flow rate: 1.0 mL/min (7) GPC column: Tosoh GMHHR-H(S), three columns (8) Detector: infrared spectrophotometer IR5 manufactured by Polymer ChAR 9. Mooney Viscosity The Mooney viscosity was measured at 125° C. in accordance with ASTM D1646.

10. Density (Unit: $g/cm^3$)

The density was measured in accordance with JIS K7112 without performing annealing.

11. Content of Monomer Units Derived from Ethylene in an Ethylene Copolymer of Component (C) (Unit: % by Weight)

Measurement was performed by nuclear magnetic resonance spectroscopy (NMR) under the following conditions (1) to (7), and then the content of monomer units derived from ethylene in the ethylene copolymer was determined in accordance with the method disclosed in literature (JMS-REV. MACROMOL. CHEM. PHYS., C29, 201-317 (1989)), where the overall amount of the ethylene copolymer was taken as 100% by weight.

(1) Instrument: AvanceIII HD600 (10-mm cryoprobe), produced by BRUKER (2) Measurement solvent: 1,1,2,2-tetrachloroethane-d2/1,2-dichlorobenzene (15/85 volume ratio)

(3) Measurement temperature: 135° C.

(4) Measurement method: proton decoupling method (5) Pulse width: 45 degrees (6) Pulse repetition time: 4 seconds (7) Chemical shift standard: tetramethylsilane 12. Method for Producing an Injection Molded Article Using an injection molding machine EC160NII manufactured by Toshiba Machine Co., Ltd. and a side gate flat mold, the thermoplastic elastomer compositions of the examples and the comparative examples were injection molded under the conditions of a cylinder temperature of 220° C. and a mold temperature of 50° C., thereby obtaining injection molded articles 90 mm in length, 150 mm in width, and 2 mm in thickness.

13. Tensile Strength (TB) (Unit: MPa)

The tensile strength at break of the injection molded article produced in the above 12. was measured in accordance with JIS K6251. The specimen used was a JIS No. 3 dumbbell, and the tensile speed was adjusted to 200 mm/min.

14. Low Temperature Impact Resistance (IZOD Impact Strength)

The impact resistance of the injection molded article produced in the above 12. was measured in accordance with JIS K7110. The measurement was carried out at −50° C. and −52° C.

The measured results were judged as follows.
NB=The molded article was not broken.
B=The molded article was broken.

15. Molding Shrinkage (Dimensional Stability, Unit: %)

Two injection molded articles were produced by varying the packing ratio of a thermoplastic elastomer composition into the mold followed by being left at rest under standard conditions of temperature and humidity at 23° C. and 50% for at least 12 hours, and then the lengths in the machine direction (MD) of the two injection molded articles were measured. Thereafter, for each of the two injection molded articles, a molding shrinkage in MD was calculated from the following calculation formula (I). Subsequently, from the difference in packing ratio into a mold and the difference in molding shrinkage in MD between the two injection molded articles, a rate of change of the mold shrinkage in MD to the packing ratio into the mold was calculated. From the obtained rate of change of the mold shrinkage in MD, a molding shrinkage in MD at the time of a packing ratio of 99% was calculated.

$$MD \text{ molding shrinkage}=(150-\text{the length in } MD)/150 \times 1000 \quad \text{(Formula (I))}$$

Likewise, as to a molding shrinkage in the transverse direction (TD), a molding shrinkage in TD at the time of a packing ratio of 99% was calculated in the same procedure as that used for the molding shrinkage in MD, by using the following formula (II).

$$TD \text{ molding shrinkage}=(90-\text{the length in } TD)/90 \times 1000 \quad \text{(Formula (II))}$$

16. Rigidity

The rigidity of the injection molded article produced in the above 12. was measured in accordance with JIS K7203. The specimen used was a JIS No. 3 dumbbell, and the bending speed was adjusted to 1 mm/min.

[Raw Materials]

<Component (A)>

(A-1) Propylene Polymeric Material Produced by Multistage Polymerization and Composed of Propylene Homopolymer Component (I) and Ethylene-Propylene Copolymer Component (II) (NOBLEN AZ565 Produced by Sumitomo Chemical Co., Ltd.) (MFR=32 g/10 minutes; melting temperature=164.6° C.; $[\eta cxs]$=5.0dl/g; $[\eta cxs]/[\eta cxis]$=5.0; isotactic pentad fraction=0.98)

Content of propylene homopolymer component (I)=84% by weight; content of the ethylene-propylene copolymer component (II)=16% by weight Content of monomer units derived from ethylene of ethylene-propylene copolymer component (II)=35% by weight Content of monomer units derived from propylene of ethylene-propylene copolymer component (II)=65% by weight (A-2) Propylene Polymeric Material Produced by Multistage Polymerization and Composed of Propylene Homopolymer Component (I) and Ethylene-Propylene Copolymer Component (II) (NOBLEN AZ564 Produced by Sumitomo Chemical Co., Ltd.) (MFR=29 g/10 minutes; melting temperature=164.6° C.; $[\eta cxs]$=2.5 dl/g; $[\eta cxs]/[\eta cxis]$=2.1; isotactic pentad fraction=0.98)

Content of propylene homopolymer component (I)=87% by weight; content of the ethylene-propylene copolymer component (II)=13% by weight Content of monomer units derived from ethylene of ethylene-propylene copolymer component (II)=46% by weight Content of monomer units derived from propylene of ethylene-propylene copolymer component (II)=54% by weight (A-3) Propylene Homopolymer (NOBLEN Y501N Produced by Sumitomo Chemical Co., Ltd.) (MFR=13 g/10 Minutes, Melting Temperature=161.8° C.)

<Component (B)>

(B-1) Ethylene-Propylene-Dicyclopentadiene Copolymer Royalene 5087, Produced by Lion Copolymer The Mooney viscosity ($ML_{1+4}$, 125° C.)=50, the content of monomer units derived from ethylene=50% by weight, the content of monomer units derived from propylene=50% by weight, the iodine value =2, the molecular weight distribution=1.8, and the eluted amount at −15° C. measured by cross-fractionation chromatography (CFC)=99.1% of the overall eluted amount.

(B-2) Ethylene-Propylene-5-Ethylidene-2-Norbornene Copolymer Preparation

To a polymerization vessel made of stainless steel and equipped with a stirrer, hexane, ethylene, and propylene were fed at rates of 222 g/(hr·L), 18.3 g/(hr·L), and 71.5 g/(hr·L), respectively, per unit time and unit polymerization vessel volume. After mixing and stirring with a line mixer, $VOCl_3$ was fed to the polymerization vessel at a rate of 41.4 mg/(hr·L). Moreover, ethylaluminum sesquichloride (EASC) and hydrogen were fed to the polymerization vessel at rates of 248.4 mg/(hr·L) and 0.03 NL/(hr·L), respectively. Moreover, 5-ethylidene-2-norbornene was fed to the polymerization vessel at a rate of 1.7 g/(hr·L). The temperature of the polymerization vessel was kept at 41° C. In the polymerization vessel, a non-conjugated diene copolymer was generated at a rate of 45 g/(hr·L) per unit time and unit polymerization vessel volume.

The Mooney viscosity ($ML_{1+4}$, 125° C.), the content of monomer units derived from ethylene, the content of monomer units derived from propylene, the iodine value, the molecular weight distribution, and the eluted amount at −15° C. measured by cross-fractionation chromatography (CFC) of the non-conjugated diene copolymer obtained by the above-described method are as follows.

The Mooney viscosity ($ML_{1+4}$, 125° C.)=81, the content of monomer units derived from ethylene=53% by weight, the content of monomer units derived from propylene=47% by weight, the iodine value=9, the molecular weight distribution=2.5, and the eluted amount at −15° C. measured by cross-fractionation chromatography (CFC)=92% of the overall eluted amount.

(B-3) Ethylene-Propylene-5-Ethylidene-2-Norbornene Copolymer Preparation

To a polymerization vessel made of stainless steel and equipped with a stirrer, hexane, ethylene, and propylene were fed at rates of 657 g/(hr·L), 27.7 g/(hr·L), and 110.0 g/(hr·L), respectively, per unit time and unit polymerization vessel volume. After mixing and stirring with a line mixer, $VOCl_3$ was fed to the polymerization vessel at a rate of 62.6 mg/(hr·L). Moreover, ethylaluminum sesquichloride (EASC) and hydrogen were fed to the polymerization vessel at rates of 250.4 mg/(hr·L) and 0.06 NL/(hr·L), respectively. Moreover, 5-ethylidene-2-norbornene was fed to the polymerization vessel at a rate of 6.4 g/(hr·L). The temperature of the polymerization vessel was kept at 41° C. In the polymerization vessel, a non-conjugated diene copolymer was generated at a rate of 67 g/(hr·L) per unit time and unit polymerization vessel volume.

The Mooney viscosity ($ML_{1+4}$, 125° C.), the content of monomer units derived from ethylene, the content of monomer units derived from propylene, the iodine value, the molecular weight distribution, and the eluted amount at −15° C. measured by cross-fractionation chromatography (CFC) of the non-conjugated diene copolymer obtained by the above-described method are as follows.

The Mooney viscosity ($ML_{1+4}$, 125° C.)=56, the content of monomer units derived from ethylene=50% by weight, the content of monomer units derived from propylene=50% by weight, the iodine value=20, the molecular weight distribution=3.4, and the eluted amount at −15° C. measured by cross-fractionation chromatography (CFC)=95.1% of the overall eluted amount.

(B-4) Ethylene-Propylene Copolymer Preparation

To a polymerization vessel made of stainless steel and equipped with a stirrer, hexane, ethylene, and propylene were fed at rates of 620 g/(hr·L), 28.0 g/(hr·L), and 126.8 g/(hr·L), respectively, per unit time and unit polymerization vessel volume. After mixing and stirring with a line mixer, $VOCl_3$ was fed to the polymerization vessel at a rate of 51.7 mg/(hr·L). Moreover, ethylaluminum sesquichloride (EASC) and hydrogen were fed to the polymerization vessel at rates of 134.4 mg/(hr·L) and 0.02 NL/(hr·L), respectively. The temperature of the polymerization vessel was kept at 41° C. In the polymerization vessel, a ethylene-propylene copolymer was generated at a rate of 67 g/(hr·L) per unit time and unit polymerization vessel volume.

The Mooney viscosity ($ML_{1+4}$, 125° C.), the content of monomer units derived from ethylene, the content of monomer units derived from propylene, the iodine value, the molecular weight distribution, and the eluted amount at −15° C. measured by cross-fractionation chromatography (CFC) of the ethylene-propylene copolymer obtained by the above-described method are as follows.

The Mooney viscosity ($ML_{1+4}$, 125° C.)=48, the content of monomer units derived from ethylene=62% by weight, the content of monomer units derived from propylene=38% by weight, the iodine value=0, the molecular weight distribution=2.0, and the eluted amount at −15° C. measured by cross-fractionation chromatography (CFC)=89.8% of the overall eluted amount.

(B-5) Ethylene-Propylene-5-Ethylidene-2-Norbornene Copolymer Preparation

To a polymerization vessel made of stainless steel and equipped with a stirrer, hexane, ethylene, and propylene were fed at rates of 452 g/(hr·L), 34.4 g/(hr·L), and 240.3 g/(hr·L), respectively, per unit time and unit polymerization vessel volume. After mixing and stirring with a line mixer, $VOCl_3$ and ethanol were fed to the polymerization vessel at rates of 30.0 mg/(hr·L) and 14.4 mg/(hr·L), respectively, ($VOCl_3$/ethanol=1/1.8 (molar ratio)). Moreover, ethylaluminum sesquichloride (EASC) and hydrogen were fed to the polymerization vessel at rates of 180.0 mg/(hr·L) and 0.04 NL/(hr·L), respectively. Moreover, 5-ethylidene-2-norbornene was fed to the polymerization vessel at a rate of 0.4 g/(hr·L). The temperature of the polymerization vessel was kept at 42° C. In the polymerization vessel, a non-conjugated diene copolymer was generated at a rate of 38 g/(hr·L) per unit time and unit polymerization vessel volume.

The Mooney viscosity ($ML_{1+4}$, 125° C.), the content of monomer units derived from ethylene, the content of monomer units derived from propylene, the iodine value, the molecular weight distribution, and the eluted amount at −15° C. measured by cross-fractionation chromatography (CFC) of the non-conjugated diene copolymer obtained by the above-described method are as follows.

The Mooney viscosity ($ML_{1+4}$, 125° C.)=65, the content of monomer units derived from ethylene=50% by weight, the content of monomer units derived from propylene=50% by weight, the iodine value=2.1, the molecular weight distribution=1.9, and the eluted amount at −15° C. measured by cross-fractionation chromatography (CFC)=95% of the overall eluted amount.

(B-6) Ethylene-Propylene-5-Ethylidene-2-Norbornene Copolymer Preparation

To a polymerization vessel made of stainless steel and equipped with a stirrer, hexane, ethylene, and propylene were fed at rates of 475 g/(hr·L), 37.1 g/(hr·L), and 215.3 g/(hr·L), respectively, per unit time and unit polymerization vessel volume. After mixing and stirring with a line mixer, $VOCl_3$ and ethanol were fed to the polymerization vessel at rates of 23.1 mg/(hr·L) and 11.1 mg/(hr·L), respectively, ($VOCl_3$/ethanol=1/1.8 (molar ratio)). Moreover, ethylaluminum sesquichloride (EASC) and hydrogen were fed to the polymerization vessel at rates of 13.8 mg/(hr·L) and 0.09 NL/(hr·L), respectively. Moreover, 5-ethylidene-2-norbornene was fed to the polymerization vessel at a rate of 0.4 g/(hr·L). The temperature of the polymerization vessel was kept at 42° C. In the polymerization vessel, a non-conjugated diene copolymer was generated at a rate of 39 g/(hr·L) per unit time and unit polymerization vessel volume.

The Mooney viscosity ($ML_{1+4}$, 125° C.), the content of monomer units derived from ethylene, the content of monomer units derived from propylene, the iodine value, the molecular weight distribution, and the eluted amount at −15° C. measured by cross-fractionation chromatography (CFC) of the non-conjugated diene copolymer obtained by the above-described method are as follows.

The Mooney viscosity ($ML_{1+4}$, 125° C.)=66, the content of monomer units derived from ethylene=54% by weight, the content of monomer units derived from propylene=46% by weight, the iodine value=1.9, the molecular weight distribution=2.0, and the eluted amount at −15° C. measured by cross-fractionation chromatography (CFC)=97.7% of the overall eluted amount.

(B-7) Ethylene-propylene-5-ethylidene-2-norbornene Copolymer Preparation

To a polymerization vessel made of stainless steel and equipped with a stirrer, hexane, ethylene, and propylene were fed at rates of 661 g/(hr·L), 37.7 g/(hr·L), and 87.1 g/(hr·L), respectively, per unit time and unit polymerization vessel volume. After mixing and stirring with a line mixer, $VOCl_3$ was fed to the polymerization vessel at a rate of 35.2 mg/(hr·L). Moreover, ethylaluminum sesquichloride (EASC) and hydrogen were fed to the polymerization vessel at rates of 211.1 mg/(hr·L) and 0.05 NL/(hr·L), respectively. Moreover, 5-ethylidene-2-norbornene was fed to the polymerization vessel at a rate of 0.5 g/(hr·L) per hour. The temperature of the polymerization vessel was kept at 50° C. In the polymerization vessel, a non-conjugated diene copolymer was generated at a rate of 67 g/(hr·L) per unit time and unit polymerization vessel volume.

The Mooney viscosity ($ML_{1+4}$, 125° C.), the content of monomer units derived from ethylene, the content of monomer units derived from propylene, the iodine value, the molecular weight distribution, and the eluted amount at −15° C. measured by cross-fractionation chromatography (CFC) of the non-conjugated diene copolymer obtained by the above-described method are as follows.

The Mooney viscosity $(ML_{1+4}, 125°C.)=64$, the content of monomer units derived from ethylene=69% by weight, the content of monomer units derived from propylene=31% by weight, the iodine value=3, the molecular weight distribution=2.2, and the eluted amount at −15° C. measured by cross-fractionation chromatography (CFC)=29.1% of the overall eluted amount.

<Component (C)>

(C-1) Ethylene-1-Octene Copolymer

Engage 8842 produced by The Dow Chemical Company (content of monomer units derived from ethylene=59% by weight, content of monomer units derived from 1-octene=41% by weight, Mooney viscosity $(ML_{1+4}, 125°C.)=23$, density=0.857 g/cm$^3$)

(C-2) Ethylene-1-Octene Copolymer

Engage 8480 produced by The Dow Chemical Company (content of monomer units derived from ethylene=82% by weight, content of monomer units derived from 1-octene=18% by weight, Mooney viscosity $(ML_{1+4}, 125°C.)=20$, density=0.902 g/cm$^3$)

(C-3) Ethylene-1-Butene Copolymer

Tafmer 4050S produced by Mitsui Chemicals, Inc. (content of monomer units derived from ethylene=70% by weight, content of monomer units derived from 1-butene=30% by weight, Mooney viscosity $(ML_{1+4}, 125°C.)=7$, density=0.860 g/cm$^3$)

(C-4) Ethylene-1-Octene Copolymer

Engage 8100 produced by The Dow Chemical Company (content of monomer units derived from ethylene=66% by weight, content of monomer units derived from 1-octene=34% by weight, Mooney viscosity $(ML_{1+4}, 125°C.)=22$, density=0.870 g/cm$^3$)

Component (D): Erucamide (NEUTRON S produced by Nippon Fine Chemical Co., Ltd.)

Antioxidant 1: SUMILIZER GA80 produced by Sumitomo Chemical Co., Ltd.

Antioxidant 2: IRGAFOS 168 produced by BASF Japan

Light stabilizer 1: SUMISORB 300 produced by Sumitomo Chemical Co., Ltd.

Light stabilizer 2: TINUVIN 622SF produced by BASF Japan

Light stabilizer 3: TINUVIN 123 produced by BASF Japan

Antiseptic: Hydrotalcite (DHT-4A produced by Kyowa Chemical Industry Co., Ltd.)

Inorganic filler: Calcium carbonate (Vigot 10 produced by Shiraishi Calcium Kaisha, Ltd.)

Example 1

A thermoplastic elastomer composition was produced by melt-kneading, with a twin screw extruder at a cylinder temperature of 200° C., 54.2% by weight of propylene polymeric material (A-1), 36.7% by weight of ethylene-propylene-dicyclopentadiene copolymer (B-1), 9.1% by weight of ethylene-1-octene copolymer (C-1), where the combined amount of the components (A), (B), and (C) is taken as 100% by weight, as well as 0.05 parts by weight of erucamide (D), 0.2 parts by weight of antioxidant 1, 0.1 parts by weight of antioxidant 2, 0.2 parts by weight of light stabilizer 1, 0.1 parts by weight of light stabilizer 2, 0.1 parts by weight of light stabilizer 3, 0.2 parts by weight of antiseptic 1, and 0.6 parts by weight of an inorganic filler, each relative to 100 parts by weight in total of the aforementioned components (A), (B), and (C). The thermoplastic elastomer composition obtained was injection molded by the method described in the above section 12., thereby obtaining a molded article. The physical property measurements of the molded article are shown in Table 1.

Examples 2 to 8 and Comparative Examples 1 to 6

Thermoplastic elastomer compositions were produced in the same manner as Example 1 using the ingredients and the contents shown in Table 1. The thermoplastic elastomer compositions obtained were individually injection molded by the method described in the above section 12., thereby obtaining molded articles. The physical property measurements of the molded articles are shown in Tables 1 and 2.

TABLE 1

| | | Example | | | | | | | |
|---|---|---|---|---|---|---|---|---|---|
| | | 1 | 2 | 3 | 4 | 5 | 6 | 7 | 8 |
| (A-1) | | 54.2 | 54.2 | | 54.2 | 54.0 | 55.0 | 55.0 | |
| (A-2) | | | | 56.0 | | | | | |
| (A-3) | | | | | | | | | 45.5 |
| (B-1) | | 36.7 | | 35.2 | 36.1 | 31.0 | | | 43.7 |
| (B-2) | | | 36.7 | | | | | | |
| (B-3) | | | | | | | | | |
| (B-4) | | | | | | | | | |
| (B-5) | | | | | | | 36.0 | | |
| (B-6) | | | | | | | | 36.0 | |
| (B-7) | | | | | | | | | |
| (C-1) | | 9.1 | 9.1 | 8.8 | | 15.0 | 9.0 | 9.0 | 10.8 |
| (C-2) | | | | | | | | | |
| (C-3) | | | | | | | | | |
| (C-4) | | | | | 9.1 | | | | |
| Low temperature impact resistance | −52° C. (Broken state) | NB | B | NB | NB | NB | NB | NB | NB |
| | −50° C. (Broken state) | NB | NB | NB | NB | NB | NB | NB | NB |
| Rigidity | MPa | 460 | 450 | 410 | 400 | 400 | 430 | 430 | 410 |
| Tensile strength | MPa | 14 | 14 | 13 | 14 | 14 | 14 | 14 | 14 |
| Molding shrinkage (Estimated value at the time of 99% packing) | MD (‰) | 7.1 | 10.3 | 8.5 | 7.2 | 7.0 | 5.9 | 6.2 | 5.7 |
| | TD (‰) | 9.2 | 12.5 | 9.5 | 9.6 | 9.3 | 8.2 | 8.4 | 8.1 |

TABLE 2

| | | Comparative Example | | | | | |
|---|---|---|---|---|---|---|---|
| | | 1 | 2 | 3 | 4 | 5 | 6 |
| (A-1) | | 54.2 | 54.2 | 54.2 | 54.2 | 54.2 | 54.2 |
| (A-2) | | | | | | | |
| (A-3) | | | | | | | |
| (B-1) | | | | | | | |
| (B-2) | | 36.7 | 20.8 | | | 36.7 | |
| (B-3) | | | | 36.7 | | | |
| (B-4) | | | | | 36.7 | | |
| (B-5) | | | | | | | |
| (B-6) | | | | | | | |
| (B-7) | | | | | | | 36.7 |
| (C-1) | | | 25.0 | 9.1 | 9.1 | | 9.1 |
| (C-2) | | 9.1 | | | | | |
| (C-3) | | | | | | 9.1 | |
| (C-4) | | | | | | | |
| Low temperature impact resistance | −52° C. (Broken state) | B | B | B | NB | B | B |
| | −50° C. (Broken state) | B | B | B | NB | NB | B |
| Rigidity | MPa | 480 | 420 | 490 | 380 | 440 | 450 |
| Tensile strength | MPa | 15 | 18 | 16 | 15 | 12 | 20 |
| Molding shrinkage (Estimated value at the time of 99% packing) | MD (‰) | 11.1 | 8.3 | 9.7 | 5.8 | 9.9 | 6.3 |
| | TD (‰) | 13.1 | 10.7 | 11.8 | 8.4 | 12.3 | 8.4 |

What is claimed is:

1. A thermoplastic elastomer composition comprising component (A) defined below, component (B) defined below, and component (C) defined below, wherein the content of the component (A) is 40% by weight to 70% by weight and the combined content of the component (B) and the component (C) is 30% by weight to 60% by weight, where the total of the contents of the components (A), (B), and (C) is taken as 100% by weight, and the ratio of the content of the component (B) to the content of the component (C) is 1.1 to 20, component (A): a polypropylene resin having a content of monomer units derived from propylene of more than 60% by weight but not more than 100% by weight, where the overall amount of the polypropylene resin is taken as 100% by weight;

component (B) comprises a non-conjugated diene copolymer comprising monomer units derived from ethylene, monomer units derived from at least one selected from the group consisting of propylene and α-olefins having 4 to 8 carbon atoms, and monomer units derived from a non-conjugated diene, wherein the content of the monomer units derived from ethylene is 40% by weight to 65% by weight, and the content of the monomer units derived from the at least one selected from the group consisting of propylene and α-olefins having 4 to 8 carbon atoms is 35% by weight to 60% by weight, where the total of the content of the monomer units derived from ethylene and the content of the monomer units derived from the at least one selected from the group consisting of propylene and α-olefins having 4 to 8 carbon atoms is taken as 100% by weight, the non-conjugated diene polymer having an iodine value of 0.1 to 20, a Mooney viscosity ($ML_{1+4}$, 125° C.) of 40 to 85, a molecular weight distribution of 1.5 to 3.0, and the eluted amount at −15° C. measured by cross-fractionation chromatography (CFC) is 50% to 99.9% of the overall eluted amount;

component (C) comprises an ethylene copolymer comprising monomer units derived from ethylene and monomer units derived from at least one selected from the group consisting of propylene and α-olefins having 4 to 8 carbon atoms, wherein the content of the monomer units derived from ethylene is 55% by weight to 95% by weight, and the content of the monomer units derived from the at least one selected from the group consisting of propylene and α-olefins having 4 to 8 carbon atoms is 5% by weight to 45% by weight, where the overall amount of the component (C) is taken as 100% by weight, and the copolymer having a Mooney viscosity ($ML_{1+4}$, 125° C.) of 20 to 30 and a density of 0.850 $g/cm^3$ to $g/cm^3$.

2. The thermoplastic elastomer composition according to claim 1, wherein the component (A) is a propylene polymeric material having been obtained by multistage polymerization, comprising 70% by weight to 95% by weight of (I) a propylene homopolymer component, and 5% by weight to 30% by weight of (II) an ethylene copolymer component comprising monomer units derived from at least one selected from the group consisting of propylene and α-olefins having 4 to 20 carbon atoms and monomer units derived from ethylene, where the overall amount of the propylene polymeric material is taken as 100% by weight, wherein the content of the monomer units derived from ethylene in the ethylene copolymer component (II) is 22% by weight to 80% by weight, the content of the monomer units derived from the at least one selected from the group consisting of propylene and α-olefins having 4 to 20 carbon atoms is 20% by weight to 78% by weight, where the total of the content of the monomer units derived from ethylene and the content of the monomer units derived from the at least one selected from the group consisting of propylene and α-olefins having 4 to 20 carbon atoms is taken as 100% by weight.

3. A molded article obtained by molding the thermoplastic elastomer composition according to claim 1.

4. A molded article obtained by molding the thermoplastic elastomer composition according to claim 2.

* * * * *